(12) United States Patent
Justiss et al.

(10) Patent No.: US 9,141,542 B1
(45) Date of Patent: Sep. 22, 2015

(54) SYSTEM, METHOD AND COMPUTER PROGRAM PRODUCT FOR HOST SYSTEM LTFS AUTO-ADAPTATION

(75) Inventors: Steven A. Justiss, Lakeway, TX (US); Peter Anthony DeLine, Austin, TX (US); William H. Moody, II, Austin, TX (US)

(73) Assignee: KIP CR P1 LP, New York, NY (US)

( * ) Notice: Subject to any disclaimer, the term of this patent is extended or adjusted under 35 U.S.C. 154(b) by 214 days.

(21) Appl. No.: 13/531,310

(22) Filed: Jun. 22, 2012

(51) Int. Cl.
*G06F 12/08* (2006.01)
*G06F 17/30* (2006.01)
*G06F 3/06* (2006.01)

(52) U.S. Cl.
CPC .............. *G06F 12/08* (2013.01); *G06F 3/0601* (2013.01); *G06F 17/30067* (2013.01)

(58) Field of Classification Search
CPC ........................................................ G06F 12/08
USPC ....................................................... 711/1–200
See application file for complete search history.

(56) References Cited

U.S. PATENT DOCUMENTS

| 2002/0004883 | A1* | 1/2002 | Nguyen et al. ................ 711/111 |
| 2004/0111485 | A1* | 6/2004 | Mimatsu et al. .............. 709/213 |
| 2008/0015734 | A1* | 1/2008 | Wideman et al. ............ 700/214 |
| 2009/0164714 | A1* | 6/2009 | Wideman et al. ............ 711/111 |

OTHER PUBLICATIONS

HP OEM Newsletter, Sep. 2010.*
Pease et al. "The Linear Tape File System" 2010.*
Pease et al. "The Linear Tape File System", 2010, PDF attached.*
HP OEM Newsletter, Sep. 2010, PDF attached.*
Pease, David, et al., "The Linear Tape File System," IBM Yamato Lab, 2010, 8 pages, #978-1-4244-7153-9/10, IEEE, U.S.
Linear Tape File System (LTFS) Format Specification, LTFS Format Version 2.0.0., Mar. 11, 2011, 69 pages, accessed on Sep. 29, 2011 at http://www.trustito.com/LTFS_Format_To%20Print.pdf.
Long Term File System Information Center 1.2.1.1, Overview, LTFS Format, IBM Corp., 2010, 1 pg.
HP Linear Tape File System (LTFS), HP OEM Newsletter, Sep. 2010, 15 pgs.
Anyone Using LTFS with LTO-5? Post, Reduser.net, Sep. 29, 2010, 3 pgs. at <<http://reduser.net/forum/showthread.php?t=50309>>.
Coolen, Ilja, IBM's Long Term Filesystem, short term usage? Apr. 26, 2010, 3 pgs. at <<http://www.iljacoolen.nl/2010/04/ibms-long-term-filesystem-short-term-usage/>>.

* cited by examiner

*Primary Examiner* — Cheng-Yuan Tseng
*Assistant Examiner* — Zubair Ahmed
(74) *Attorney, Agent, or Firm* — Sprinkle IP Law Group

(57) ABSTRACT

System, apparatus and computer program product for automatically determining a type of tape drive that is present in a media library and accessing the tape drive using commands that are adapted to the identified type of the drive. In one embodiment, a system includes a set of hosts, a media library and an archive node appliance. The archive node appliance is coupled between the hosts and the media library to provide the hosts with access to a set of drives and media in the media library. The archive node appliance has a processor and a data store that contains instructions that are executable on the processor to perform, for one or more of the drives, the method of identifying the type of the drive, identifying a set of software applications adapted to control the drive, and executing the software application, where the drive is accessed through the software application.

20 Claims, 5 Drawing Sheets

SYSTEM, METHOD AND COMPUTER PROGRAM PRODUCT FOR HOST SYSTEM LTFS AUTO-ADAPTATION

TECHNICAL FIELD

This disclosure relates to the field of data storage. More particularly, this disclosure relates to automatically determining a type of tape drive that is present in a media library and accessing the tape drive using commands that are adapted to the identified type of the tape drive.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs, data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command (e.g., the SCSI "move medium" command) to the robot and the robot moves the tape cartridge.

Recently, the Linear Tape File System (LTFS) Format Specification by IBM and the LTO Program (hereby fully incorporated by reference in its entirety for all purposes) has been developed, which defines a file system for LTO-5 tapes, LTO-6 tapes and may be extended to other tapes using an eXtensible Markup Language (XML) schema architecture. The term "file system" may be used interchangeably with "filesystem". This file system support allows the use of an LTFS-formatted tape as if it were a file system. Files and directories may appear in a directory listing, files may be dragged and dropped from tape, data may be accessed at the file level, etc.

Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

While LTFS defines a standardized format for the data that is stored on LTFS tapes, allowing the tapes themselves to be written and read by any system that includes LTFS support, the operation of the LTFS-compatible drives themselves is not standardized. In other words, the set of LTFS executable software applications (including at least LTFS, LTFSCK and MKLTFS applications) that controls one manufacturer's drive generally will not be suitable to control another manufacturer's drive. In some cases, a particular manufacturer's executable will be configured so that it will not operate with another manufacturer's drive. Consequently, if a user attempts to access an LTFS tape drive using the wrong LTFS executable, the drive generally will not operate as intended.

SUMMARY

Embodiments described herein provide systems and methods for automatically determining a type of tape drive that is present in a media library and accessing the tape drive using commands that are adapted to control the identified type of the tape drive. In one embodiment, a system for automatically adapting one or more hosts to one or more drives in a media library includes a set of hosts, a media library and an archive node appliance. The archive node appliance is coupled between the hosts and the media library to provide the hosts with access to a set of drives and media contained in the media library. The archive node appliance has a processor and a data store. The data store contains instructions that are executable on the processor to cause the archive node appliance to perform, for one or more of the drives, the method of identifying the type of the drive, identifying a software application adapted to control the drive, and executing the software application, where the drive is accessed through the software application.

In one embodiment, the archive node appliance is configured to provide access to a set of LTFS-compatible drives that may be provided by different vendors and may require different LTFS executables to control the drives (in other words, an executable that is compatible with one drive may not be compatible with another). The archive node appliance automatically adapts itself to the available drives by, for example, querying the drives using SCSI Inquiry commands to determine the types of drives, selecting and mounting a tape cartridge in a drive, mounting the associated LTFS filesystem, and then providing access to each drive using the appropriate executable. The type of each drive may be determined by the vendor, product name, serial number or other information associated with the drive. The archive node appliance may be configured to generate a softlink (in the case of Linux, a udev symlink) for each drive that serves as a pathname for that drive. The softlink may include information that identifies the type of the drive, so that software such as higher-level archival software can determine the drive type from the softlink.

An alternative embodiment comprises an archive node appliance that includes a processor and a data store. The archive node appliance has a first set of ports that enable the archive node appliance to be coupled to one or more hosts, and a second set of ports that enable the archive node appliance to be coupled to one or more drives of a media library. The data store contains a set of computer instructions that are executable on the processor to perform a method which includes, for one or more of the drives, identifying the type of the drive, identifying the software application adapted to control the drive, and executing the software application, where the drive is accessed through the software application. The software application adapted to control the drive may be selected from multiple LTFS executables, each of which is configured to control a corresponding type of LTFS-compatible tape drive and is incompatible with other types of LTFS-compatible tape drives. In one embodiment, the archive node appliance detects each LTFS-compatible tape drive, issues SCSI Inquiry commands to the LTFS-compatible tape drive, receives identifying information from the LTFS-compatible tape drive, mounts a tape in the LTFS-compatible tape drive, selects one of multiple LTFS executables adapted to control the LTFS-compatible tape drive, invokes the selected LTFS executable selected for the LTFS-compatible tape drive, mounts the LTFS filesystem for the LTFS-compatible tape drive, and accesses the LTFS-compatible tape drive through the selected LTFS software application. The archive node appliance may obtain identifying information that includes the vendor of the drive, the drive's product name, and the drive's serial number, and may generate a softlink which contains this information and is used as a pathname for the drive. The softlink can therefore be used to identify the LTFS executable adapted to control the drive.

Another alternative embodiment comprises a computer program product. The computer program product is a non-transitory computer readable medium having a set of instructions stored thereon. The instructions are executable by a processor of an archive node appliance to perform the method of, for at least a first drive, identifying the type of a drive, identifying a software application adapted to control the drive, and executing the software application, where commands directed to the drive are received by the software application, which forwards corresponding commands to the drive. The software application may be selected from multiple LTFS software applications, each of which is configured to control a corresponding type of LTFS-compatible tape drive and is incompatible with other types of LTFS-compatible tape drives. The instructions of the computer program product may cause an archive node appliance to detect available LTFS-compatible tape drives, issue SCSI Inquiry commands to the LTFS-compatible tape drives, receive identifying information from the LTFS-compatible tape drives, mount a tape in one of the LTFS-compatible tape drives, select (from multiple executables) an LTFS executable adapted to control the LTFS-compatible tape drive, invoke the selected LTFS executable for the LTFS-compatible tape drive, mount the LTFS filesystem for the LTFS-compatible tape drive, and access the LTFS-compatible tape drive using the selected LTFS executables. The instructions of the computer program product may generate softlinks that serve as pathnames for each drive, where each softlink contains sufficient information to identify the executable adapted to control the corresponding drive.

Other alternative embodiments are also possible.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
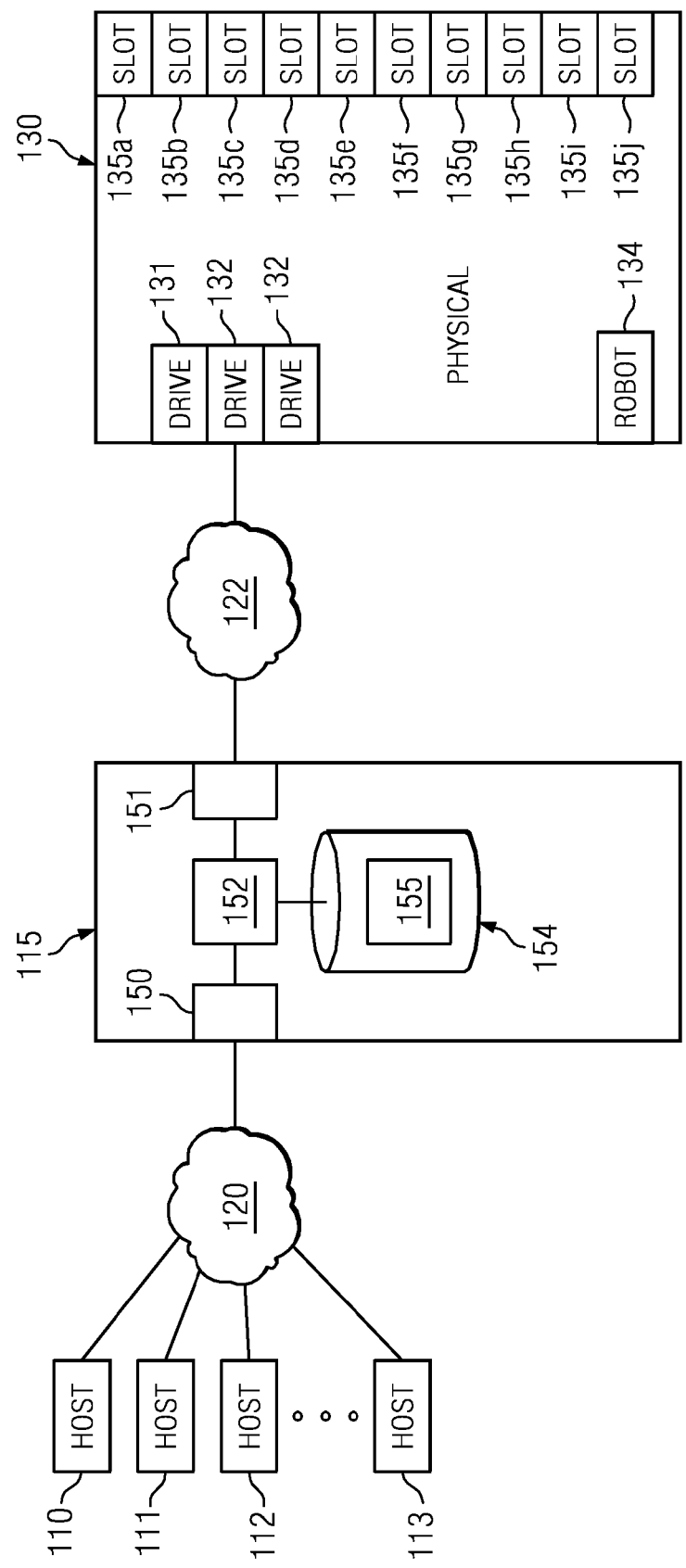
FIG. 1 is a diagrammatic representation of one embodiment of system comprising an Archive Node Appliance.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It will be recalled from the above discussion that in many instances it may be desired to provide a file system utilizing media libraries. To that end, attention is now directed to systems and methods for implementing a file system utilizing a tape library. In particular, embodiments may present a network based file system to one or more host devices. These host devices may utilize the network based file system to organize, store, read or perform other operations in association with files. These files may be managed in conjunction with a tape library. Specifically, commands in a network file system protocol may be received. These commands may be associated with operations to be performed on files, including operations associated with the organization, storage or retrieval of those files. Library control functionality that allows tapes in the tape library to be tracked and tapes to be moved into and out of drives and storage slots is utilized to manage the tape library.

LTFS (including Library LTFS) may be employed in conjunction with the tape library, such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library. It should be noted here that while embodiments as discussed include a tape library having tapes formatted according to LTFS, other types of media libraries that utilize media of the same or different type, where the media may be formatted according to the same or another type of file system may be employed in other embodiments.

To increase performance, embodiments of such a system may include a data store, which may be on a storage medium that is relatively faster for random accesses such as a disk. Files that are stored by the host devices using the networked based file system may initially be stored on the disk. These files are subsequently migrated to tapes in the tape library. Once a file has been migrated, all or a portion of that file may be deleted from the disk. When a file is subsequently accessed, it can be determined if the file is on the disk or stored on tape. The file can then be accessed from the disk, a tape or a combination of the two. File operations performed through the network file system can occur on files in the data store, rather than directly on the file on tape.

Although LTFS defines a standardized format for data stored on LTFS tapes, this is not true of LTFS-compatible tape drives themselves. Conventionally, the manufacturer of an LTFS-compatible drive provides a set of executable LTFS applications (an "LTFS executable") that communicate with a software driver application for the drive. The software driver application controls the drive, and different manufacturer's drives may be controlled by different driver applications. For instance, HP drives use an st driver, and IBM drives use a lin_tape driver. The LTFS executable for a particular manufacturer communicates with an appropriate driver representation of the drive (e.g., "/device/st3" for an HP drive, or "/device/IBMtape2" for an IBM drive). If the appropriate LTFS executable and driver are used, the driver transforms commands received from the LTFS executable into the appropriate commands for the drive and forwards the commands to the drive.

When it is desired to use an LTFS tape, a tape cartridge must first be mounted in an LTFS-compatible tape drive. A library control application (referred to as a device arbiter in one embodiment) communicates with a robotic device (a "library robot") to move a designated tape cartridge from a designated storage location (a "slot") to the tape drive. After the tape has been mounted in the drive, Linux must mount the LTFS filesystem. In one embodiment, this is accomplished by invoking an LTFS executable. Once the LTFS executable is invoked and the LTFS filesystem mounted, the file system receives standardized file system commands and generates corresponding commands that are forwarded to the driver application, which in turn forwards drive-specific commands to the drive. The drive then performs the appropriate actions associated with the file system commands (e.g., writing data to the tape mounted in the drive). If the LTFS executable that is invoked is not appropriate for that particular drive, the executable and driver may not operate properly, or may not operate at all. Alternatively, the commands generated by the executable may not be compatible with the drive, or may cause the drive to perform an action that was not intended to be performed.

Because the LTFS executable of one manufacturer's drive and the associated driver application typically will not correctly control the drives of other manufacturers, a host system that uses an LTFS-compatible drive is conventionally dedicated to one manufacturer. In other words, the host system is connected only to drives of a particular manufacturer and runs the LTFS executables of that particular manufacturer. If the host system were to be configured to operate with a different manufacturer's drive, it would be necessary for a user to determine the manufacturer of the drive to be used, to determine the appropriate LTFS executable (the executable provided by the manufacturer of the drive), and to invoke the appropriate LTFS executable to mount the LTFS filesystem for the drive. If the user did not correctly perform these steps, the LTFS-compatible drive would not operate as expected, and might not operate at all.

Rather than having a system that is dedicated to a single manufacturer's LTFS-compatible drives, it may be desirable for the system to be capable of operating with the drives of multiple manufacturers, without the need for human intervention. In particular, it may be desirable for an Archive Node Appliance that interfaces between host systems and standalone LTFS-compatible drives or media libraries that contain LTFS-compatible drives to be capable of operating with the drives of several different manufacturers. Further, it may be desirable for such an Archive Node Appliance to be capable of automatically determining the types of LTFS-compatible drives that are present, selecting the appropriate LTFS executable for each of the LTFS-compatible drives, and invoking the selected executables for the corresponding drives. The Archive Node Appliance is therefore capable of operating with a media library that contains drives of a first vendor, a media library that contains drives of a second vendor, or a media library that contains drives of multiple vendors. Further, the Archive Node Appliance does so without the need for a user to configure the Archive Node Appliance or otherwise intervene in its operation.

FIG. 1 is a diagrammatic representation of a system in which a media library is managed to present a network based file system to a plurality of hosts (i.e. host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this embodiment, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

Archive Node Appliance 115 is coupled to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in this embodiment, it should be understood that Archive Node Appliance 115 can be implemented in a variety manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. The tape cartridges are stored in a series of slots when they are not in a drive and a robot moves the magnetic tape cartridges between the drives and slots.

As an example, media library 130 can comprise drives 131-133, robot 134 and slots 135 (individually slots 135a-j).

It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that though the embodiment depicts only a single media library, other embodiments may be coupled to, and utilize, multiple media libraries.

Archive Node Appliance 115 comprises a computer processor 152 and a computer readable memory 154 (e.g. RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art.

In operation, computer instructions 155 can be executable such that Archive Node Appliance 115 can present a network based file system (i.e. a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5, LTO-6 compliant drives and tapes in media library 130 may be formatted according to LTFS (for example, as disclosed in the Linear Tape File System Format Specification Version 2.0, or other version by IBM, hereby incorporated by reference in its entirety). In one embodiment, the drives may be manufactured by one or more vendors. In other embodiments, the drives may be compliant with other types of tapes and the tapes may be formatted according to other tape file systems.

Computer instructions 155 may be executable to store files received through the networked based file system on the LTFS tapes in the media library 130 and maintain mapping information between the files visible through the network based file system and the location of those files in the media library. Computer instructions 155 may include LTFS executables for a single vendor, or for multiple vendors. In one embodiment, computer instructions 155 includes LTFS executables for several different vendors, and also includes instructions that query the LTFS-compatible drives for information that determines which of the LTFS executables should be mounted for each drive in order to properly control the drives.

The files visible through the network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, invoke an LTFS executable for the drive, mount the LTFS filesystem and access the file to, for example, read the remainder of the file into the intermediate storage.

To increase performance, in some embodiments, it may be desired to store files on computer readable memory 154 when they are initially received, and migrate these files to the media library 130 at a later point. Computer instructions 155 may therefore be executable to store files stored by hosts using the network based file system to the computer readable memory 154. At some later point, the computer executable instructions 155 may be executable to migrate the file from the computer readable memory 154 to the media library 130. In this case, computer executable instructions 155 are executable to maintain mapping information between the files visible through the network based file system and the location of those files on the computer readable memory 154 or the media library 130.

The use of LTFS in conjunction with the media library 130 can afford a number of advantages when employed by an Archive Node Appliance 115 to implement a networked based file system. One important advantage is that the file system structure presented through the file system may be substantially mirrored on the tapes of the media library 130. Accordingly, if there is a failure of the Archive Node Appliance 115 or media library 130, the files on the tapes of the media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software. As noted above, the Archive Node Appliance may be configured to automatically detect the specific types of drives that are present in the media library and invoke appropriate LTFS executables for each of the drives, so that it is not necessary for users to have specific knowledge of the drive types, or to invoke the corresponding LTFS executables for each of the drives.

To put a finer point on some of the advantages offered by embodiments disclosed herein, the functionality and performance of a network based file system may be achieved while simultaneously achieving the benefits of storage on a medium typically used for backup without the need for any type of specific backup application. The use of an Archive Node Appliance may abstract the media library to implement a network based file system and hide the corresponding complexity entailed by the use of such a media library. By using a computer readable memory which is relatively faster for random accesses such as a disk in conjunction with the media library to provide the network based file system the Archive Node Appliance may provide the speed customarily associated with a network based file system by masking the latency of the use of the media library. Simultaneously, the use of such a media library provides the benefit of having files automatically stored on a storage media typically used for backup without specific action by users or the use of a backup application.

Furthermore, the use of LTFS in conjunction with the media library allows the file system created by users using the network based file system to be mirrored on the storage media. Thus, when restoring files from the storage media of the media library in the event of a failure, no specialized structural knowledge is required. The files on the storage media are in the locations where they were placed by the users in conjunction with the network based file system. Moreover, since LTFS is commonly supported data on the storage media may be easily accessed without the need for specialized software such as a backup application. Still further, because the Archive Node Appliance is configured to identify the types of the drives in the media library and to invoke the proper LTFS executables for the drives, the Archive Node Appliance enables the use of different vendors' drives without requiring the user to have any foreknowledge of the drives or the corresponding executables.

Figure 2:
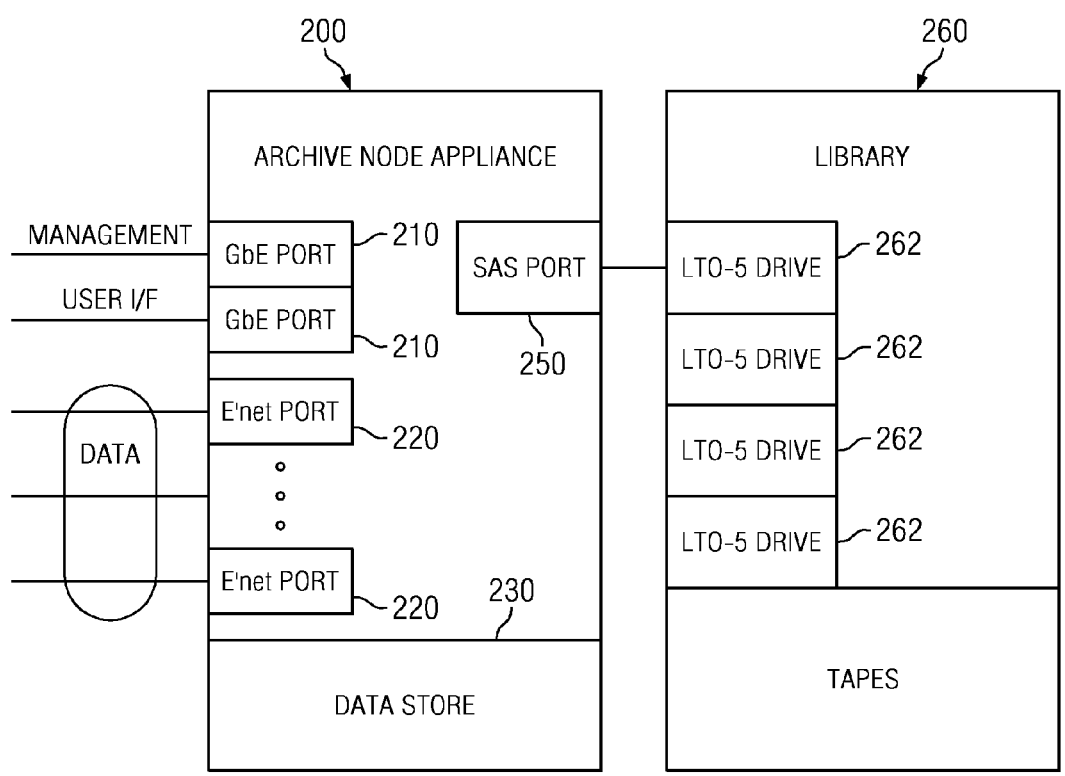
FIG. 2 is a diagrammatic representation of one embodiment of an Archive Node Appliance.

It may be helpful here to illustrate architectures for certain embodiments of an Archive Node. FIG. 2 depicts one embodiment of an architecture for an Archive Node that may be used in instances where relatively lower capacity is desired. Here, the Archive Node Appliance 200 may comprise one or more Gigabit Ethernet ports 210. These Gigabit Ethernet ports 210 may be dedicated to providing a user interface or for a systems management interface such as the Intelligent Management Platform Interface (IPMI). The Archive Node Appliance 200 may also comprise one or more Ethernet ports 220 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 220 may be coupled to hosts, such that a network based file system may be provided by the Archive Node Appliance 200 and hosts may interface with the Archive Node Appliance 200 using these Ethernet ports 220 to utilize the network based file system, for example, by storing or retrieving files using the network based file system. The network based file system may be implemented using a file system implemented in association with user space such as the File system in User space (FUSE) file system; using a kernel-based file system such as Ext2, Ext3, Ext4 Next3, etc.; or almost any other type of file system desired.

Archive Node Appliance 200 also includes a data store 230. Data store 230 may be a computer readable memory used to store computer executable instruction, files stored using the network based file system or other data utilized by Archive Node Appliance 200, as will be elaborated on in more detail subsequently. To ensure some degree of redundancy or fault tolerance, data store 230 may implemented as Redundant Array of Independent Disks (RAID) storage having around 5TB-8TB of available storage. Archive Node Appliance 200 also comprises a SAS port 250 through which the Archive Node Appliance 200 is coupled to media library 260 via a SAS bus. Media library 260 may be an IBM TS3100 tape library having one or more LTO-5 compliant drives 262 and capable of holding 24 tape cartridges or an IBM TS3200 tape library having one or more LTO-5 compliant drives 262 capable of holding 48 tape cartridges. In other embodiments, the media library may include the drives of other vendors (e.g., HP, Quantum, etc.), it may include LTO-6 compliant drives or other types of drives, and may hold various numbers of tape cartridges.

While it should be noted that Archive Node Appliance 200 may be implemented in substantially in any form factor desired, in one embodiment Archive Node Appliance may be based on a rack-mount storage format and may, for example, be contained in a chassis of a 1 U, 2 U or 3 U form factor with the data store residing internally to the chassis.

Figure 3:
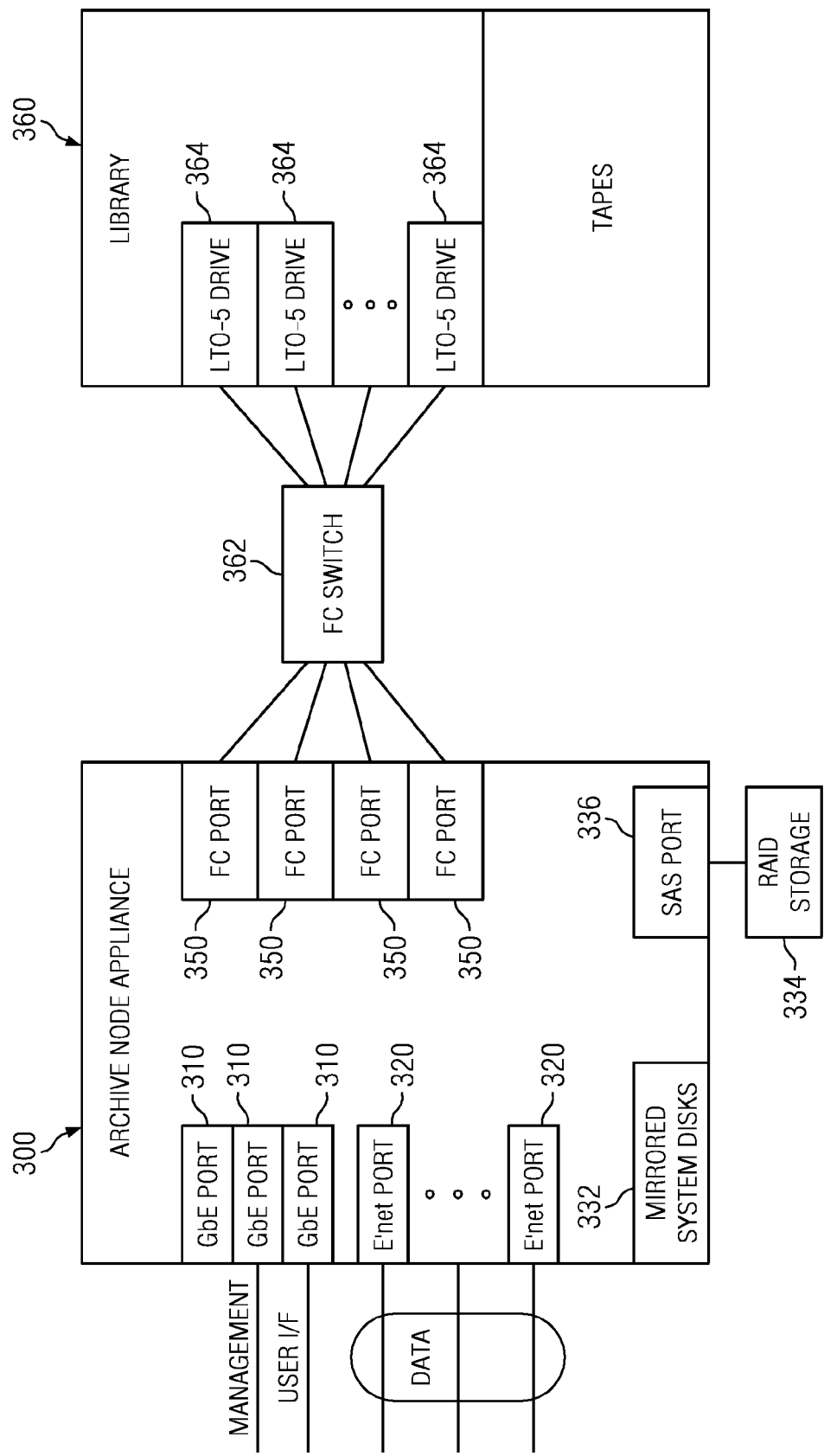
FIG. 3 is a diagrammatic representation of one embodiment of an Archive Node Appliance.

Moving on, FIG. 3 depicts one embodiment of an architecture for an Archive Node Appliance that may be used in instances where relatively greater storage capacity is required, such as in, for example, large data installations or a cloud storage provider. In this embodiment, the Archive Node Appliance 300 may comprise one or more Gigabit Ethernet ports 310. These Gigabit Ethernet ports 310 may be dedicated to providing a user interface or for a systems management interface. The Archive Node Appliance 300 may also comprise one or more Ethernet ports 320 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 320 may be coupled to hosts, such that a network based file system may be provided by the Archive Node Appliance 300 and hosts may interface with the Archive Node Appliance 300 using these Ethernet ports 320 to utilize the network based file system, for example, by storing or retrieving files using the network based file system. As noted above, the network based file system may be implemented using a file system implemented in association with user space such as the File system in User space (FUSE)file system; using a kernel-based file system such as Ext2, Ext3, Ext4 Next3, etc.; or almost any other type of file system desired. Archive Node Appliance 300 also includes a data store 334.

Data store 334 may be a computer readable memory used to store computer executable instructions, files stored using the network based file system or other data utilized by Archive Node Appliance 300. To ensure redundancy or fault tolerance, data store may comprise a mirrored system disk 332 comprising the computer executable instruction and other data utilized by the Archive Node Appliance 300 during operation and Redundant Array of Independent Disks (RAID) storage 334 coupled to the Archive Node Appliance 300 through SAS port 336. The RAID storage may be used to store files associated with the network based file system and may have around 9TB-150TB of available storage. Archive Node Appliance 300 also comprises fibre channel ports 350 through which the Archive Node Appliance 300 is coupled to media library 360 via a fibre channel switch 362. These fibre channel ports 350 may be, for example, 16, 8, 4 or 2 GB fibre channel ports. Media library 360 may be an LTFS tape library, such as an IBM TS3500 tape library having one or more LTO-5 compliant drives 364 and capable of holding around 20,000 tapes. Media library 360 may alternatively contain tape drives manufactured by another vendor (or multiple vendors), a media library having one or more LTO-6 compliant drives, or a media library supporting other types of tapes that can be formatted according to a tape file system.

Again, while it should be noted that Archive Node Appliance 300 may be implemented in substantially in any form factor desired, in one embodiment Archive Node Appliance 300 may be based on a rack-mount storage format and may, for example, be contained in a chassis of a 1 U, 2 U or 3 U form factor with the data store residing internally to the chassis or portions of the data store, such as the RAID storage residing external to the chassis.

Figure 4:
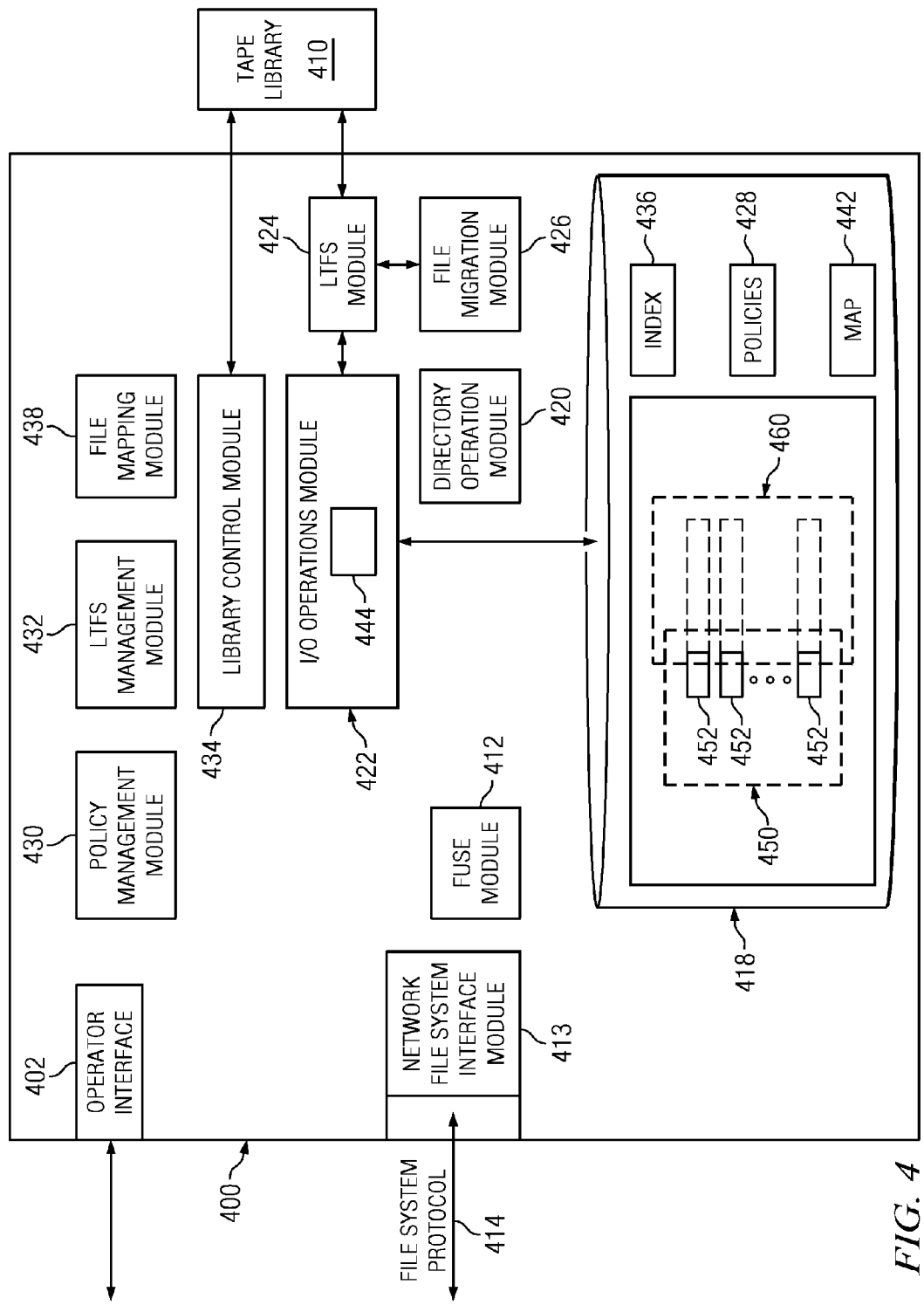
FIG. 4 is a diagrammatic representation of one embodiment of an Archive Node Appliance.

Turning now to FIG. 4, one embodiment of a functional architecture for an Archive Node is depicted. Archive Node Appliance 400 may provide an operator interface 402 through which the Archive Node Appliance 400 may be configured. Such an operator interface 402 may be provided, for example, using a network based interface such as a set of web pages or the like. Archive Node Appliance 400 is coupled to tape library 410, comprising a set of LTO-5, LTO-6 or other tape compliant drives some of which may be LTFS (or other tape file system) formatted tapes. In one embodiment, each tape in tape library 410 may be used to store data that is compressed, data that is encrypted, data that is both compressed and encrypted or data that is neither compressed nor encrypted.

Archive Node Appliance 400 comprises Filesystem in Userspace (FUSE) module 412 that may present a file system to a local operating system. A network file system interface module 413 provides access to all or a portion of the FUSE file system as one or more shared volumes (e.g., as a hierarchical file system with directories, etc.) that can be accessed using an interface that operates according to network file system protocol 414 such as NFS, CIFS, FTP, REST, etc. Data associated with the shared volumes is stored on one or more partitions of data store 418 (a computer readable memory), where the structure of the partitions of the data store 418 may, or may not, correspond to the structure of the shared volumes or to the structure of the file system presented by FUSE module 412.

Directory operations module 420 is configured to process any directory operations that are received by FUSE module 412. I/O operations module 422 is configured to process any input or output operations involved with the reading or the storing of files associated with the file system presented by the FUSE module 412. These operations include, for example, the writing of files to the data store 418, the reading of files from the data store 418, the deletion of files from the data store 418, the reading of files from a tape in the tape library 410 or other operations associated with the data store 418 or tape library 410.

These I/O operations may involve the use of library control module 434, LTFS module 424, LTFS management module 432 and index 436. The location of each tape within the tape library 410 may be maintained in index 436 (e.g. in which slot or drive each tape is located, in which library the tape is located if multiple tape libraries are in use, etc.). Additionally, in one embodiment, what type of data is stored on each tape (encrypted, compressed, neither encrypted nor compressed, etc.) may also be maintained.

Library control module 434 is configured to control the movement of the tapes in the tape library 410, including ejecting the tapes from the drives of the tape library 410, and the movement of tapes to and from slots of the tape library 410 and in and out of drives of the tape library using the robot. LTFS management module 432 is configured to mount or unmount the LTFS filesystem on a particular tape drive of the tape library 410. LTFS module 424 is configured to perform LTFS operations with respect to an LTFS mounted file system.

Because the different LTFS-compatible drives in the media library may require different LTFS executables, LTFS management module 432 is configured to determine the types of the different drives and then, for each drive, invoke the appropriate executable and mount the LTFS filesystem. LTFS management module 432 uses SCSI Inquiry commands to query each drive for identifying information, such as the vendor, product name, product revision and serial number. For each drive, after a tape cartridge has been mounted in the drive, LTFS management module 432 selects the appropriate LTFS executable for the drive and runs the executable for the drive. When the executable has been invoked, commands associated with tape operations of a particular drive are processed by the file system mounted for that drive. The executable forwards commands to the appropriate driver, which forwards to the drive the specific commands that are appropriate for that drive, causing the drive to perform the desired tape access.

Library control module 434, LTFS module 424, LTFS management module 432 and index 436 may also be utilized by file migration module 426. File migration module 426 is configured to move files from data store 418 to tape library 410 based on policies 428. File mapping module 438 maintains map 442 which correlates a file visible through the FUSE file system to its corresponding location in the tape library 410. Specifically, a mapping between the location (for example the path) and name of the file with respect to the FUSE file system, the name and location of that file in the data store 418 and the name and location of that file on one or more tapes in the tape library 410 may be maintained in map 442.

Policies 428 may, or may not be, user configured and may be associated with storage of the files or the migration of files from the data store 418 to tapes in the tape library 410. Such policies may specify, for example, how long to wait before migrating a file (referred to herein as a migration timeout period), whether the files are to be replicated when migrated (e.g. stored in conjunction with multiple Archive Nodes as will be elaborated on in more detail), how many copies of the file to keep, where the multiple copies are to be kept on different tapes, whether the file is to be encrypted or compressed, etc. The policies 428 may be defined with respect to the directories presented with respect to the FUSE module 412 such that those policies may be defined with respect to all files within that directory. Policy management module 430 allows these policies to be managed (e.g., created, updated, defined, deleted, modified, etc.) by a user or otherwise. Policies can be defined at any level of the directory structure provided by FUSE module 412. Because a directory presented by FUSE module 412 may be presented as a shared volume by network file system interface module 413, a policy that applies to the directory may also apply to the share.

In operation then, Archive Node Appliance 400 may present a network based file system accessible through an interface, where the files associated with the network based file system may be stored on the tape library 410 according to a file system structure that substantially mirrors the file system structure of the presented network based file system. A user may therefore view and otherwise access the data stored in the tape library 410 in the same manner as if the data were stored in a randomly accessible directory structure. Archive Node Appliance 400 further simplifies the user's interaction with the tape library 410 by automatically identifying the drive types and executing corresponding instructions that cause the drives to each be accessed using appropriate vendor-specific LTFS executables.

Figure 5:
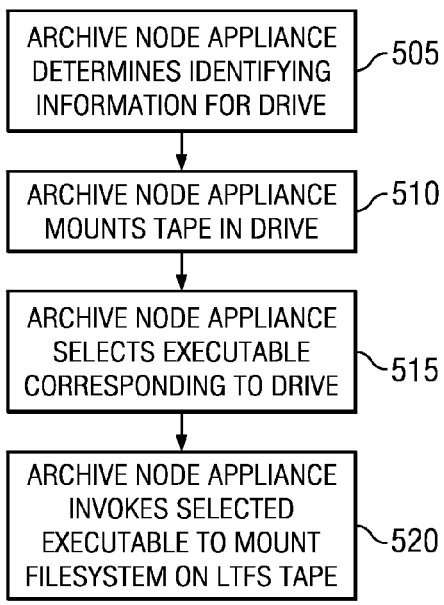
FIG. 5 is a diagrammatic representation of one embodiment of a simplified method for automatically identifying a drive and invoking an appropriate LTFS executable using an Archive Node Appliance.

Referring to FIG. 5, a simplified method for automatically identifying a drive and executing an appropriate LTFS executable using an embodiment of an Archive Node Appliance is depicted. At step 505, the Archive Node Appliance determines identifying information for the drive. This information will typically include at least the vendor of the drive, as the executable for one of a vendor's drives is commonly used for all of that vendor's drives. At step 510, a device arbiter application in the Archive Node Appliance directs the library robot to mount a tape cartridge in the drive. At step 515, based on the identifying information for the drive, the Archive Node Appliance selects an appropriate executable. For instance, if the drive is manufactured by IBM, an IBM executable may be selected. At step 520, the selected executable is invoked to mount the LTFS filesystem on the tape. After the executable has been invoked, all of the file system commands for the drive will be forwarded to the executable, which will send corresponding commands to an appropriate driver, which will forward drive-appropriate commands to the drive to access the tape that is mounted in the drive.

Figure 6:
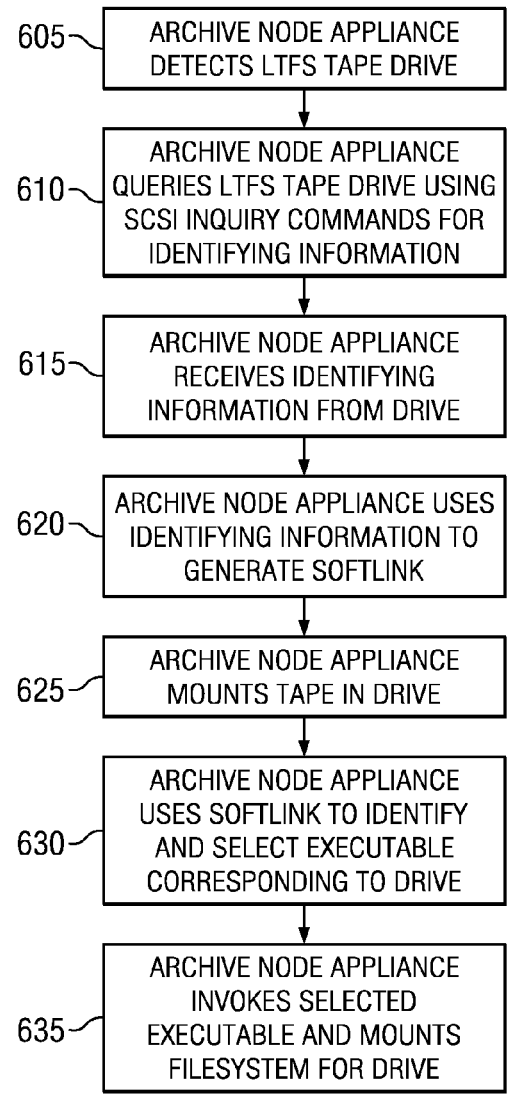
FIG. 6 is a diagrammatic representation of one embodiment of an exemplary method for automatically identifying drives and mounting corresponding executables using an Archive Node Appliance coupled to a media library.

Referring to FIG. 6, an example of a more detailed method for automatically identifying drives and running corresponding executables using an embodiment of an Archive Node Appliance coupled to a media library is depicted. Although media libraries commonly contain only drives of a single vendor, this method handles each of the drives individually, so it would be possible to use the method, and the Archive Node Appliance, with media libraries that include drives of different vendors or types and therefore require different executables to provide the appropriate drive commands.

At step 605, the Archive Node Appliance detects an LTFS-compatible tape drive. The Archive Node Appliance may be configured to detect available tape drives in various ways, such as, for example, querying the media library to identify the drives, or by receiving interrupts or notifications indicating that drives have been added to the system. After a tape drive has been detected, the Archive Node Appliance queries the drive for identifying information as shown in step 610. In one embodiment, the Archive Node Appliance does so by transmitting SCSI Inquiry commands to the drive. The drive responds to the Inquiry commands with the requested information, which may include such things as the vendor/manufacturer or the drive, the product name of the drive, the specific product revision, and the serial number of the drive. Other information which impacts the selection of an appropriate LTFS executable, or which otherwise identifies the specific drive may also be obtained by the Archive Node Appliance.

At step 615, the Archive Node Appliance receives the identifying information from the drive. In one embodiment, the Archive Node Appliance uses this identifying information to construct a Linux udev symlink and a pathname which upper-level software uses to direct commands to the drive (step 620). The symlink may, for example, take the form:

[vendor]-[product]-[serial number]

The drive can then be accessed using the constructed softlink. At step 625, the Archive Node Appliance mounts a tape in the drive. The Archive Node Appliance also uses the identifying information from the drive to determine which LTFS executable should be used with the drive and selects this executable at step 630. When a softlink having a form similar to that shown above has been constructed, the appropriate executable can be determined from the information contained in the softlink. For example, the vendor of the drive can be determined from the softlink, and that vendor's executable can be selected from one or more available executables.

At step 635, the LTFS executable that is selected for the drive is invoked, thereby mounting the LTFS filesystem for the drive. The LTFS executable may be conveniently invoked by using the softlink associated with that drive. After the executable has been invoked and the file system mounted for the drive, archival software may send commands to the tape's file system. These commands are directed to the LTFS executable, which forwards commands to the appropriate driver for the drive, which in turn forwards corresponding commands to the drive itself. The Archive Node Appliance may repeat this process for additional drives.

In one embodiment, the LTFS filesystem is mounted each time a tape is mounted in the tape drive, and unmounted when the tape is removed from the drive. In this embodiment, steps 605-620 of FIG. 6 may be performed once for each drive detected in the library to determine identifying information and construct softlinks for each of the drives. These softlinks may then be used to identify the drives when mounting tapes or running executables for the drives. Steps 625-635 may be performed multiple times for each drive in this embodiment. Thus, each time a tape is mounted in a drive, the appropriate executable is selected and invoked to mount the LTFS filesystem, and when the tape is removed from the drive, the file system is unmounted.

An example of this method follows. In this example, the drive is an Ultrium5-SCSI drive manufactured by HP. The serial number of the drive is HU1116G6H1. Upon querying the drive using SCSI Inquiry commands and obtaining this information, the Archive Node Appliance may construct the following softlink (more specifically a udev symlink) for the drive:

HP-Ultrium5-SCSI-HU1116G6H1

This softlink is a pathname for the drive. Consequently, higher-level software, such as archival software, can determine the type of the drive by referring only to the softlink. The higher-level software can therefore identify and invoke the proper LTFS executable for the drive using the softlink. Subsequently, the higher-level software can access the file system located on the tape in the drive using standard file system commands. The commands will be provided to the LTFS executable, which will send commands to the appropriate driver, which will in turn access the associated drive.

In one embodiment, a mid-level driver in the Archive Node Appliance actually constructs three clones of the physical device, and creates a softlink for each. Each softlink includes a descriptive string of the form [VENDORdevice]-[suffix], where the suffixes are LTFS, DA or RVA. The first clone (e.g., HP-Ultrium5-SCSI-HU1116G6H1-HPtape-LTFS) is associated with the drive, and is used for LTFS commands. The second clone (HP-Ultrium5-SCSI-HU1116G6H1-HPtape-DA) is associated with the device arbiter (the software controlling the robotic media changer), and is used for device arbiter commands that access the tape drive. The third clone (HP-Ultrium5-SCSI-HU1116G6H1-HPtape-RVA) is used with commands that are directed to a read-verify appliance software module. The mid-level driver registers these clones with the class driver in the SCSI kernel of Linux. The upper-level software can therefore communicate commands to the clones, and the mid-level driver forwards the commands to the respective physical devices.

In the exemplary scenario above, the Archive Node Appliance is coupled to a media library that contains an HP drive. The Archive Node Appliance has issued SCSI Inquiry commands and has received information from the drive identifying the drive as an HP Ultrium5 SCSI drive having serial number HU1116G6H1. The following instructions are illustrative of the manner in which the drive is used.

A command of the form "mount(barcode,drive)" may be issued to the device arbiter to mount a designated tape (which is identified by a barcode instruction parameter) into a designated drive (which is identified by a second instruction parameter). An exemplary command might be mountTape(AN0123L5, HP-Ultrium5-SCSI-HU1116G6H1).

In response to this instruction, the device arbiter would identify the library storage element (sometimes referred to as a "slot") where the tape with barcode AN0123L5 is stored, identify the library data transfer element associated with drive HP-Ultrium5-SCSI-HU1116G6H1, construct a Move Medium command which moves the designated tape to the designated drive, and send the Move Medium command to the library robot. Subsequently a command of the form "mountLTFS(drive,mountpoint)" may be issued to cause an HP LTFS executable to mount the LTFS filesystem on the just-mounted tape for use by LTFS. An exemplary command might be mountLTFS(HP-Ultrium5-SCSI-HU1116G6H1-HPtape-LTFS, /mnt/AN0123L5), where HP-Ultrium5-SCSI-HU1116G6H1-HPtape-LTFS is a softlink that points to device /dev/st2, and /mnt/AN0123L5 is a directory in which the LTFS filesystem is mounted. After the LTFS filesystem has been mounted, archival software can write to (or read from) directory /mnt/AN0123L5, causing data to be written to the tape drive.

When the file system is no longer needed, it is unmounted using an instruction of the form "umount mountpoint", which in this example would be umount /mnt/AN0123L5.

The LTFS write commands that are generated by the higher-level software (not explicitly shown in the sequence) are directed to the drive. These commands are directed to the LTFS executable, which forwards corresponding commands to the driver application, which sends device-appropriate commands (which may be device-specific or vendor-specific) to the drive. These commands may include, for example, commands to write data to the mounted tape, or to read data from the tape. Until the LTFS filesystem is unmounted for the tape (when the tape is unmounted from the drive), or the drive is removed from the system, the LTFS commands directed to the drive will be processed by the LTFS executable, which will forward the corresponding lower-level commands to the driver for the tape drive.

Once the appropriate LTFS executable is invoked for a drive, the higher-level software reads files from and writes files to the mounted file system, regardless of the type, vendor, etc. As noted above, these commands are actually provided to the LTFS executable—the LTFS executable receives the higher-level commands and communicates the appropriate lower-level commands directly to the drive. These lower-level commands may, in various instances, be the same for different LTFS executables, or they may be different, but they will be appropriate to cause the drive to perform the actions designated by the higher-level commands. If multiple different drives that require multiple different LTFS executables are contained in the same media library, the Archive Node Appliance will invoke the different executables as necessary for each of the different drives. For example, if the media library contains one HP drive and one IBM drive, the Archive Node Appliance will invoke an HP executable for the HP drive, and will invoke an IBM executable for the IBM drive.

As noted above in connection with the description of FIG. 6, the Archive Node Appliance is configured in this embodiment to automatically detect the drives to which it is connected, and to invoke the appropriate executable for each drive. The exemplary instructions shown above might therefore be implemented for one of the drives which is manufactured by HP. If another drive manufactured by another vendor, such as IBM, is detected, similar instructions that are configured for the IBM drive will be implemented. If multiple drives of multiple different types (e.g. drives manufactured by different vendors) are detected, corresponding drive-specific instructions will be implemented. The implementation of these instructions and the other steps of FIG. 6 are transparent to users and to the host device or devices to which the Archive Node Appliance is connected.

Referring again to FIG. 4, when the appropriate LTFS executables have been invoked for the available drives, the file systems are mounted for the tapes using LTFS management module 432. File migration module 426 may use LTFS module 424 to copy files from data store 418 to the appropriate tapes at locations on the tape which correspond to the locations of the files as presented through the file systems to the host devices coupled to the Archive Node Appliance. After the files are copied to the tapes, all, or a portion of, the files may be deleted from the data store. Accordingly, migration of the files may entail the creation of one or more directories on the mounted LTFS filesystems on the tapes, where these directories may mirror the directories in the paths where the files are stored that are visible to a user at a host device using the network based file system presented by the Archive Node Appliance 400. Additionally, when the files are copied to the mounted LTFS filesystems on the appropriate tapes, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to the LTFS module 424 that data to be stored on the tape is to be compressed. The LTFS module 424 may configure the drive holding that tape to compress data such that when the file is stored to the tape using LTFS module 424 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS filesystem on the appropriate tape one or more commands (for example, SCSI or other types of commands that may or may not include key information to be utilized) may be sent to the drive to cause it to use encryption. The LTFS filesystem can then be mounted on the tape. LTFS can then be used to store the file on the tape while the tape drive handles the encryption of the data transparently to LTFS.

Other embodiments may accomplish compression or encryption of the files in different manners. For example, in one embodiment, to speed the migration of files, Archive Node Appliance may provide hardware support for such encryption or compression. Embodiments of methods and systems for such encryption or compression are discussed in U.S. patent application Ser. No. 12/025,081, entitled "System and Method For Enabling Encryption", by Robert C. Sims, filed on Feb. 4, 2008 which is hereby incorporated by reference for all purposes.

Additionally, if a policy 428 associated with the file specifies that multiple copies of a file are to be maintained a second tape on which to store the file may be determined and the file migration module 426 may use LTFS module 424 to copy the file from data store 418 to the second tape at a location on the second tape which corresponds to the location of the file as presented through the FUSE file system. Notice here that two separate tapes may have the file stored using an LTFS filesystem path that mirrors the path of that file as presented through the FUSE file system. Furthermore, if a policy associated with the file specifies that the file is to be replicated the file may also be sent to another Archive Node Appliance, as will be discussed in more detail.

In addition to storing files on the tape, the archive node appliance may store file system metadata of the FUSE file system (or other file system) on the tape in addition to the metadata stored according to the LTFS filesystem. The metadata stored may include information necessary for the FUSE file system of another archive node appliance to present files from the tape in a similar manner as the FUSE file system of the originating archive node appliance, including associating the file with the same users, policies, etc.

When a command to read a file is received, map 442 may be consulted to determine the location of the file (e.g., whether it is located in data store 418, on a tape in the tape library 410 or both). If the requested file is completely on the data store 418, I/O operations module 432 may respond to the read of the file using the file as stored in the data store 418. If the file is on a tape (and not entirely in the data store 418), the tape on which the file is located may be determined using the map 442. The index 436 and the library control module 434 can then be utilized to determine if the tape is in a drive, and if not, to load the appropriate tape into a drive of the tape library 410. The file system on the tape may be mounted using LTFS management module 432. I/O operations module 422 can then use LTFS module 424 to access the file on the tape and respond to the read of the file.

It will be noted here that certain actions may be taken in association with the read file before the file is used to respond to the read. In particular, in certain embodiments, actions associated with one or more policies applicable to the file may be performed. For example, if a policy that applies to the file specifies that the file should be compressed, the file may be decompressed as the file is read from the tape and before the file is used to respond to the read of the file. In one embodiment, the use of LTFS may simplify this decompression. Specifically, the tape on which the file is stored may be formatted to store compressed data. The presence of this type of tape in the drive may indicate to the LTFS module 424 that data stored on the tape is compressed. The LTFS module 424 may thus configure the drive holding that tape such that when the file is read from the tape using LTFS module 424 it is decompressed.

Similarly, if an applicable policy specifies that the file is to be encrypted the file may be decrypted before the file is used to respond to the read of the file. As LTFS may not support encryption, in one embodiment, decryption of the file being stored may be accomplished by the tape drive in which the appropriate tape is located. Specifically, before mounting the LTFS filesystem on the tape on which the file is stored one or more commands (for example, SCSI or other types of commands that may or may not include key information to be utilized) may be sent to the drive to cause it to decrypt the file. The LTFS filesystem can then be mounted on the tape. LTFS can then be used to read the file while the tape drive handles the decryption of the data transparently to LTFS. The file is then used to respond to the read of the file.

If the file is located on the tape and the FUSE file system does not contain metadata for the file, the FUSE file system metadata stored on the tape can be read and stored. Consequently, if files on the tape were originally stored by a first archive node appliance and the tape read by a second archive node appliance, the file system of the second archive node appliance will have the information necessary to describe the files, including information not typically maintained or used by the LTFS filesystem of the tape.

In many cases, however, if the file is located on tape, it may take a relatively long amount of time to access the file. This situation may be exacerbated if, for example the file system on the tape is not currently mounted, the tape itself is not currently in a drive of the tape library, the tape is currently positioned at a location far away from the location where the file is located, etc. These conditions can result in an access time for a file on tape that is on the order of minutes.

Many network based file system protocols have timeout conditions. For example, in the CIFS protocol, an OPEN or a READ command must be responded to within 30 seconds or a timeout condition will occur. The timeout condition may be dependent on the type of network file systems used. In some cases, the timeout period is negotiated between a host and file system. Thus, the Archive Node Appliance 400 can be configured to negotiate the timeout time with hosts. The timeout time can be set in a configuration setting for Archive Node Appliance 400. As a result, the time period for responding to such a command may be less than that needed to access the file on the tape. In order to present network based file systems based on these types of protocols such conditions may need to be addressed.

To that end, in some embodiments, read cache 450 may be maintained on data store 418. Read cache 450 may comprise the first portion 452 of each file stored using the network based file system presented by the Archive Node Appliance 400. When a file is read, then, if any portion of the file is to be read from tape the first portion 452 of the read file that is stored in the read cache 450 may be used to respond to the read, while substantially simultaneously accessing the file on the tape. Since the first portion 452 of the file is stored in the read cache 450 on the data store 418 it can be accessed quickly enough that a timeout on commands can be avoided while the file on the tape is accessed. The remainder of the file can then be read from the tape and used to respond to the commands. The size of the first portion 452 of each file may be user configurable, based on system parameters, or defined in some other manner.

It will be noted that the read cache 450 may comprise first portions 452 of none, all, or some subset of, the files that are stored in conjunction with the network based file system. For example, if data store 418 is corrupted or otherwise unusable, when the data store 418 is replaced read cache 450 may comprise first portions 452 of none of the files. The read cache 450 may then be repopulated as files are accessed by users through the network based file system. During this repopulation then, read cache 450 may comprise first portions 452 of some subset of the files that are stored in conjunction with the network based file system.

Accordingly, in some embodiments, when a file is read if any portion of the file is to be read from tape it can be determined if the first portion 452 of that file is in the read cache 450. If it is that first portion 452 may be used to respond to the read as detailed above. If, however, the first portion 452 of the read file is not in read cache 450, the file may be read from tape and used to respond to the read. Additionally, the file data read from tape may be used to repopulate the read cache 450 by storing the first portion 452 of the read in the read cache 450 at that time (embodiments of which will be discussed in more detail below).

In one embodiment, as a CIFS command may have a 30 second timeout period and an average or poor timing scenario for a tape access may be on the order of 4 minutes, the first portion 452 of each file stored in the read cache 450 may comprise the first 512K of each file. In one embodiment, the read cache size may be based on directories provided by the FUSE module 412 so that all the files within the directory are a particular size. If the directory is presented as a share, the policy thus applies to files within the share. In another embodiment, the size retained on read cache 450 may be dependent upon the size of blocks that may be read in a single operation via the network file system, the set time for a timeout and the time required to load, mount and position a tape with the requested file. It will be noted that the data in the read cache 450 may be stored in a manner corresponding to the format in which the file is stored on the tape. Thus, for example, if the file is compressed when it is migrated to tape the read cache 450 may comprise the first portion 452 of the file in compressed format, where this first portion equals approximately 512 k of data when uncompressed.

Initially then, when a host device using a CIFS based file system provided by the Archive Node Appliance wishes to read a file it may send an OPEN command to the Archive Node Appliance 400. I/O operations module 422 may determine if the requested file is completely in the data store 418 using map 442. If so, I/O operations module 422 may respond to the read of the file using the file in the data store 418.

If however, the file is on a tape, the tape on which the file is located may be determined using the map 442. The I/O operations module 422 can then initiate the load and access of the file on the tape using the library control module 434 and the LTFS management module 432. I/O operations module 422 delays the response to the initial OPEN command for a time period less than the timeout associated with the received command. In some embodiments, this time period may be the longest time period that does not result in a timeout occurring (e.g., 20 seconds, 29 seconds in the case of CIFS commands, or another time period in the case of commands in other protocols, etc.).

The host device may subsequently send a READ command for a certain amount (e.g., 64K or a different amount) of the file to the Archive Node Appliance 400. I/O operations module 422 can delay the response to this READ command as long as possible without a timeout resulting (e.g., 20 second, 29 seconds, in the case of CIFS commands, or another time period below the 30 second timeout in the case of commands in other protocols). After the delay, the I/O operation module 422 will respond to the command with the data requested. The I/O operations module 422 may continue to delay responses to subsequent READ commands and utilize data from the read cache 450 to respond to the READ commands until data from the first portion 452 is exhausted or the LTFS filesystem on the appropriate tape is mounted and the file on the tape can be accessed using LTFS module. The I/O operations module may continue to delay responses and dynamically switch between delaying responses and not delaying responses as needed.

In addition to delaying responses, Archive Node Appliance 400 can return less data than requested by the host. For example, Archive Node Appliance 400 may return 1K instead of the requested 64K. Whether Archive Node Appliance 400 returns less data than the amount requested may depend on the network file system protocol, host operating system or other factors. Returning less data than requested provides the advantage that the read cache can be smaller.

I/O operation module 422 may then use LTFS module 424 to access the file on the tape and respond to subsequent READ commands for the file. More specifically, in one embodiment I/O operations module 422 may utilize LTFS module 424 to access the file on the appropriate tape and read the file from the tape into buffer 444. Subsequent READ commands for the file may be responded to using the data in the buffer 444.

Furthermore, in some embodiments, in addition to reading the file into buffer 444 the file may also be read into a file cache 460 on the data store. File cache 460 may be an area on data store utilized for temporary storage of files and may be managed according to almost any cache management technique desired. In certain cases if a host does not request data of the file at a particular rate (e.g., does not issue READ commands frequently enough, or the READ commands do not request a certain amount of data, etc.), after a certain number of READ commands I/O operations module 422 may respond to subsequent READ commands for the file using data of the file from the file cache.

In certain embodiments the opposite may also occur. More specifically, in some instances the reading of file data to the file cache 460 in addition to reading the file into buffer 444 may slow the response to requests for data from the host. In this case, reading the file data into both buffer 444 and file cache may mean that data cannot be delivered at the rate the user is requesting the data or may otherwise slow the response to user requests. Here, the reading of the data of the file into the file cache 460 may be stopped before the entire file is in the file cache such that requests for the file may be serviced more quickly. Thus, the portion of the file that is in file cache 460 may comprise none, some, or all, of a file.

In one embodiment, the file may be stored in the file cache 460 by appending any portions of the file which are read from the tape to the first portion 452 of the file in the read cache 450 if such a first portion of the read file exists in read cache 450. Thus, if the first portion 452 exists in the read cache 450 when any portion of the file not comprised by first portion 452 in the read cache is read from the tape it may be appended to the first portion 452 already stored in the read cache 450. In either case (the first portion 452 does, or does not, exist in the file cache) the entire file may be stored in the file cache 460 when the file is read. Thus, at a later point, if portions of the file are deleted from the file cache 460 the first portion 452 of the file may be left on the data store 418 such that the first portion 452 of the file is in read cache 450. Accordingly, the read cache 450 will be repopulated with the first portion of that file if the first portion 452 was not in the read cache 450 before the file was read.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for automatically adapting one or more hosts to one or more drives in a media library, the system comprising:
a set of hosts;
a media library having
a set of drives, and
a set of media, including at least one Linear Tape File System (LTFS) formatted tape; and
an archive node appliance coupled between the media library and the set of hosts and configured to process any input or output operations involving at least two different file systems, including the LTFS and a network based file system supported by the set of hosts, the archive node appliance having a processor, a data store and a set of computer instructions executable on the processor to:
for at least a first drive in the set of drives,
determine identifying information for the first drive,
mount a LTFS formatted tape in the first drive,
select a first executable based on the identifying information determined for the first drive, and
execute the first executable to mount the LTFS on the LTFS formatted tape,
wherein the archive node appliance accesses the first drive through the first executable.

2. The system of claim 1, wherein the set of drives includes one or more LTFS tape drives, wherein the data store contains a plurality of sets of LTFS software applications, each of which is configured to control a corresponding type of LTFS-compatible tape drive and is incompatible with other types of LTFS-compatible tape drives, wherein the first drive is one of the LTFS-compatible tape drives, and wherein the first set of software applications is one of the LTFS software applications.

3. The system of claim 2, wherein the type of each LTFS-compatible tape drive comprises the vendor of the LTFS-compatible tape drive, and wherein the LTFS software application corresponding to the LTFS-compatible tape drive is the LTFS software application of the vendor of the LTFS-compatible tape drive.

4. The system of claim 1, wherein the archive node appliance is configured to identify the first type of the first drive by communicating Small Computer System Interface (SCSI) inquiry commands to the first drive and receiving identifying information from the first drive in response to the SCSI Inquiry commands.

5. The system of claim 1, wherein the archive node appliance is configured to generate a softlink associated with the first drive, wherein the softlink contains sufficient information to identify the first set of software applications adapted to control the first drive.

6. The system of claim 5, wherein the first type of the first drive is identified by a vendor name, a product name, and a product serial number.

7. The system of claim 1, wherein the archive node appliance is configured to detect the presence of the first drive, and to identify the first type of the first drive in response to detecting the presence of the first drive.

8. The system of claim 1, wherein the set of drives includes a plurality of LTFS tape drives, wherein the data store contains a plurality of sets of LTFS software applications, each of which is configured to control a corresponding type of LTFS-compatible tape drive and is incompatible with other types of LTFS-compatible tape drives, wherein for each of the LTFS-compatible tape drives in the set of drives, the archive node appliance detects the LTFS-compatible tape drive, issues Small Computer System Interface (SCSI) Inquiry commands to the LTFS-compatible tape drive, receives identifying information from the LTFS-compatible tape drive, selects one of the plurality of sets of LTFS software applications adapted to control the LTFS-compatible tape drive, mounts the selected set of LTFS software application for the LTFS-compatible tape drive, and accesses the LTFS-compatible tape drive through the selected set of LTFS software application.

9. An archive node appliance comprising:
a processor;
one or more host ports configured to couple the archive node appliance to a set of hosts, the archive node appliance configured to process any input or output operations involving at least two different file systems, including a Linear Tape File System (LTFS) and a network based file system supported by the set of hosts;
one or more library ports configured to couple the archive node appliance to a media library having a set of drives and a set of media, including at least one LTFS formatted tape;
a data store containing a set of computer instructions executable on the processor to, for at least a first drive in the set of drives,
determine identifying information for the first drive,
mount a LTFS formatted tape in the first drive,
select a first executable based on the identifying information determined for the first drive, and
execute the first executable to mount the LTFS on the LTFS formatted tape,
wherein the archive node appliance accesses the first drive through the first executable.

10. The archive node appliance of claim 9, wherein the data store contains a plurality of sets of LTFS software applications, each of which is configured to control a corresponding type of LTFS-compatible tape drive and is incompatible with other types of LTFS-compatible tape drives.

11. The archive node appliance of claim 10, wherein for each of the LTFS-compatible tape drives in the set of drives, the archive node appliance detects the LTFS-compatible tape drive, issues Small Computer System Interface (SCSI) Inquiry commands to the LTFS-compatible tape drive, receives identifying information from the LTFS-compatible tape drive, selects one of the plurality of sets of LTFS software applications adapted to control the LTFS-compatible tape drive, mounts the selected set of LTFS software application for the LTFS-compatible tape drive, and accesses the LTFS-compatible tape drive through the selected set of LTFS software application.

12. The archive node appliance of claim 11, wherein the identifying information for each LTFS-compatible tape drive comprises at least the vendor of the LTFS-compatible tape drive, and wherein the set of LTFS software applications adapted to control the LTFS-compatible tape drive is the set of LTFS software applications of the vendor of the LTFS-compatible tape drive.

13. The archive node appliance of claim 9, wherein the archive node appliance is configured to generate a softlink associated with the first drive, wherein the softlink contains sufficient information to identify the first set of software applications adapted to control the first drive.

14. The archive node appliance of claim 13, wherein the first type of the first drive is identified by a vendor name, a product name, and a product serial number.

15. The archive node appliance of claim 13, wherein the archive node appliance is configured to provide the softlink associated with the first drive to one or more hosts coupled to the one or more host ports.

16. A computer program product comprising a non-transitory computer readable medium having a set of instructions stored thereon, the instructions executable by a processor of an archive node appliance to process any input or output operations involving at least two different file systems, including a Linear Tape File System (LTFS) and a network based file system supported by the set of hosts, the instructions when executed by the processor cause the archive node appliance to:
for at least a first drive in a media library having at least one LTFS formatted tape,
determine identifying information for the first drive,
mount a LTFS formatted tape in the first drive,
select a first executable based on the identifying information determined for the first drive, and
execute the first executable to mount the LTFS on the LTFS formatted tape, wherein commands directed to the first drive are received by the executable, and
wherein the executable forwards corresponding commands to the first drive.

17. The computer program product of claim 16, wherein the first set of software applications is selected from a plurality of sets of LTFS software applications, each of which is configured to control a corresponding type of LTFS-compatible tape drive and is incompatible with other types of LTFS-compatible tape drives.

18. The computer program product of claim 17, wherein for each of a plurality of LTFS-compatible tape drives in a set of drives, the instructions executable by the processor of the archive node appliance detect the LTFS-compatible tape drive, issue Small Computer System Interface (SCSI) Inquiry commands to the LTFS-compatible tape drive, receive identifying information from the LTFS-compatible tape drive, select one of the plurality of sets of LTFS software applications adapted to control the LTFS-compatible tape drive, mount the selected set of LTFS software applications for the LTFS-compatible tape drive, and access the LTFS-compatible tape drive through the selected set of LTFS software applications.

19. The computer program product of claim 18, wherein the identifying information for each LTFS-compatible tape drive comprises at least the vendor of the LTFS-compatible tape drive, and wherein the set of LTFS software applications adapted to control the LTFS-compatible tape drive is the set of LTFS software applications of the vendor of the LTFS-compatible tape drive.

20. The computer program product of claim 16, wherein the instructions executable by the processor of the archive node appliance to generate a softlink associated with the first drive, wherein the softlink contains sufficient information to identify the first set of software applications adapted to control the first drive.

* * * * *